Aug. 18, 1959 — B. L. OLIVER — 2,900,083
FILTER BED STRUCTURE
Filed Sept. 10, 1956

INVENTOR.
Burton L. Oliver
BY
ATTORNEY

United States Patent Office 2,900,083
Patented Aug. 18, 1959

2,900,083

FILTER BED STRUCTURE

Burton L. Oliver, Kansas City, Mo.

Application September 10, 1956, Serial No. 608,985

1 Claim. (Cl. 210—293)

This invention relates to improvements in sand and gravel filtering basins forming a part of water purification systems, and more particularly, to a novel bed for such basins taking the form of a plurality of initially separate blocks that in turn are provided with gooseneck nozzles for properly and advantageously directing the water from the uppermost surfaces of the blocks to a point of discharge therebeneath.

The most important object of the present invention is to provide a filter bed structure that appreciably reduces head loss in the filtering basin.

It is the primary object of the present invention to provide filter bed structure that facilitates and renders more effective the operation of cleaning the filter through conventional back-wash methods.

It is an important object of the instant invention to provide filter bed structure of the aforementioned character that may be easily and inexpensively shipped and installed by virtue of the provision of a series of side-by-side, lightweight, cementitious blocks, each of which is in turn provided with a plurality of frusto-conical openings for receiving the gooseneck nozzles that are held in place through the medium of grout placed in the openings.

Another important object of the instant invention is the provision of filter bed structure wherein the nozzles may be easily and quickly installed because of the provision of nozzle-receiving openings formed to permit wedging of the nozzles in place in resting relationship to upwardly facing shoulders within the openings.

Another object is to maintain substantially unrestricted equalization of water pressure beneath the bed by providing the blocks with feet for supporting the same in elevated condition above the bottom of the filter basin.

A further object is to initially hold the nozzles in place at the bottoms thereof through the medium of commercial joint compound whereby the grout may be poured into the openings to seal the same into proper positions.

Figure 1:
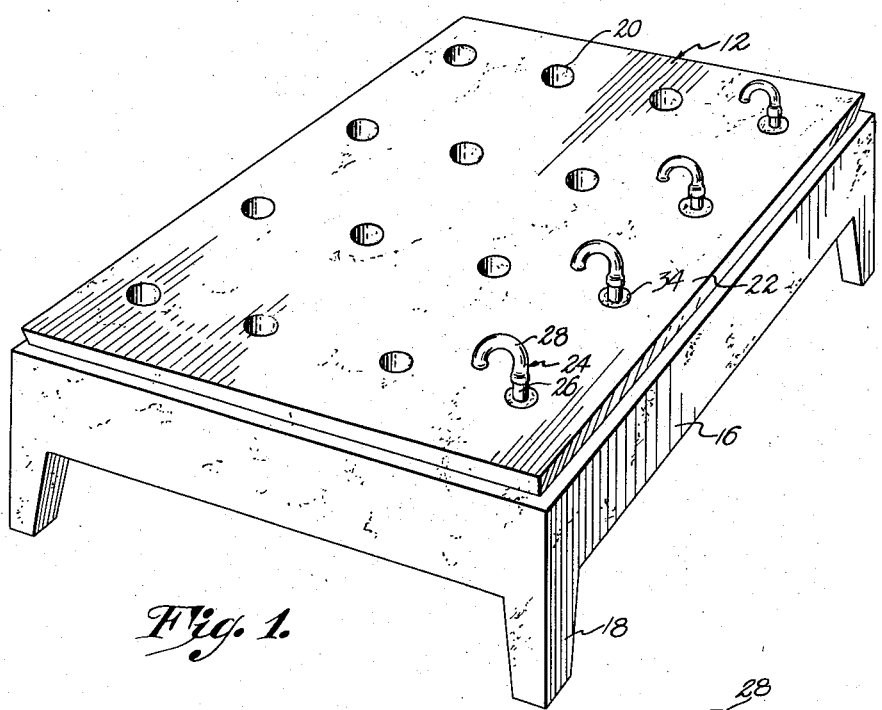
Figure 1 is a perspective view of a block forming a part of the filter bed structure of the instant invention.
Figure 3:
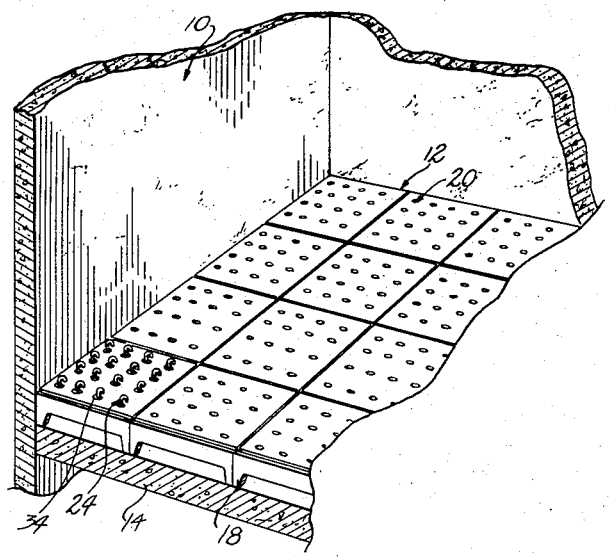
Fig. 3 is a fragmentary, perspective view of the filter bed structure on a reduced scale.

Conventional water purification systems commonly employ a filter basin broadly designated by the numeral 10, containing a filling of sand and gravel (not shown), the instant invention relating to bed structure broadly designated by the numeral 12 that rests directly on bottom 14 of the basin 10.

Filter bed structure 12 includes a plurality of side-by-side and end-to-end identical polygonal blocks 16, each of which is provided with a plurality of feet or legs 18 supporting the blocks 16 on the bottom 14 in an elevated position with respect to the latter.

Each of the blocks 16 is provided with a plurality of vertical, frusto-conical openings 20 that progressively increase in diameter as the uppermost face 22 of the block 16 is approached. Openings 20 are divided into an upper portion 21 and a lower portion 23 by an upwardly-facing, annular, internal shoulder 25.

Figure 2:
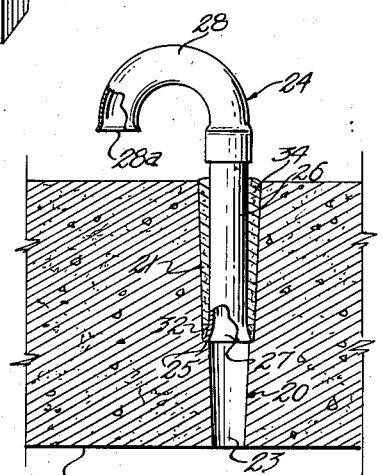
Fig. 2 is an enlarged, fragmentary, detailed, cross-sectional view through the block illustrating one of the gooseneck nozzles thereof.

A gooseneck nozzle 24 is provided for each opening 20 respectively, the tubular nozzles 24 including a vertical stem portion 26 having an outwardly-flared, lowermost end 27, and a substantially arcuate nozzle portion 28. The outside diameter of the end 27 of the stem 26 is greater than the smallest diameter of the portion 21 of opening 20 to the end that when the stem 26 is inserted into the opening 20 as shown in Fig. 2, the stem 26 will be wedged tightly into opening 20 against shoulder 25 in spaced relationship to bottom 30 of the block 16. After the stem 26 is thus inserted into the opening 20, it is sealed in place adjacent the lowermost end thereof by use of conventional joint compound 32. Thereupon, when a filling of grout 34 is poured into portion 21 of the opening 20 to completely seal the stem 26 and hold the latter in place, compound 32 prevents the grout 34 from running into opening portion 23. When the nozzle 24 is in place, the open terminal end 28a of the arcuate portion 28 thereof, should face downwardly toward the upper surface 22 of the block 16.

In use, after the series of blocks 16 are placed within the basin 10 directly on the bottom 14 thereof, the sand and gravel is placed in the basin 10 in the usual manner and when the water is filtered through such sand and gravel, it finds its way through the nozzles 24, discharging toward the bottom 14, through openings 20, between the bottom 14 and the lower face 30 of the blocks 16. Manifestly, the basin 10 is provided with a suitable outlet (not shown) for the clear water emanating from between the blocks 16 and the bottom 14.

Conversely, when the filter is cleaned in the usual way by conventional back-washing procedures, the flush water is forced into the basin 10 beneath the blocks 16 and such water flows upwardly through the nozzles 24, discharging downwardly from the open ends 28a toward the upper surfaces 22 of the blocks 16.

It is apparent that the entire filter bed structure 12 is inexpensive to manufacture and entirely replaces the conventional perforated laterals now employed for such purposes. Blocks 16 are preferably made from a suitable lightweight, cementitious material and are, therefore, easily handled and inexpensively placed in the basin 10 upon the bottom 14 thereof. Furthermore, by virtue of the novel manner of mounting the nozzles 24 in place within the openings 20, the entire bed structure 12 may be quickly and inexpensively manufactured without need of skilled help.

Blocks 16 may be shipped without packaging and being lightweight, the cost of shipment is not excessive. After blocks 16 are placed in the basin 10, the nozzles 24 may be quickly mounted in the openings 20 without need for skilled help because of the simple procedure above outlined.

A primary advantage of the improved bed relates itself to back-wash. Wash water is directed to the basin beneath the blocks 16 and is distributed to all of the nozzles 24 equally. As the wash water emanates from the open ends 28a, it is first directed downwardly against the upper surface of the bed. Consequently, there is little, if any channeling of the water as it rises in the filter, eliminating "blow holes" which customarily occur during back-washing when conventional bed structures are employed. The wash water, therefore, quickly and effectively removes all of the mud and other material from the sand, rock, gravel and other aggregate forming the filter.

Having thus described the invention what is claimed as new and desired to be secured by Letters Patent is:

An assembly for use in forming a bed for a filter basin, said assembly comprising: a block provided with a plurality of elongated, vertical openings therethrough, and an upwardly facing shoulder in each opening respectively, defining a lower portion, and a frusto-conical upper portion tapering inwardly as the shoulder is approached; an inverted J-shaped, tubular nozzle for each opening respectively having a looped portion having an open extremity spaced above and facing the top of the block and an elongated, vertical leg extending downwardly into a corresponding opening and having an outwardly flared lower extremity resting on the shoulder and in substantially continuous lateral engagement with the internal surface of the block defining said upper portion of the opening, said lower extremity of the leg being open and registering directly with said lower portion of the opening in coaxial relationship thereto; and a cementitious seal surrounding the leg of each nozzle and filling the upper portion of the corresponding opening, said block being provided with a plurality of supporting legs depending from the bottom thereof for holding the lower extremity of the openings spaced above the bottom of a filter basin in which the assembly is used.

References Cited in the file of this patent

UNITED STATES PATENTS

| | | |
|---|---|---|
| 1,077,037 | Bradley | Oct. 28, 1913 |
| 1,429,477 | Williamson | Sept. 19, 1922 |
| 1,698,079 | Wagner | Jan. 8, 1929 |

FOREIGN PATENTS

| | | |
|---|---|---|
| 406,025 | Great Britain | Feb. 19, 1934 |